United States Patent
Karpman et al.

(10) Patent No.: US 12,217,480 B1
(45) Date of Patent: Feb. 4, 2025

(54) DETECTING AND MONITORING UNAUTHORIZED USES OF VISUAL CONTENT

(71) Applicant: Castle Global, Inc., San Francisco, CA (US)

(72) Inventors: Dmitriy Karpman, San Francisco, CA (US); Kevin Guo, San Francisco, CA (US); Ryan Weber, San Francisco, CA (US)

(73) Assignee: CASTLE GLOBAL, INC., San Francisco, CA (US)

( * ) Notice: Subject to any disclaimer, the term of this patent is extended or adjusted under 35 U.S.C. 154(b) by 0 days.

(21) Appl. No.: 18/421,825

(22) Filed: Jan. 24, 2024

Related U.S. Application Data

(60) Provisional application No. 63/481,375, filed on Jan. 24, 2023.

(51) Int. Cl.
*G06V 10/74* (2022.01)
*G06F 16/951* (2019.01)
(Continued)

(52) U.S. Cl.
CPC .......... *G06V 10/761* (2022.01); *G06F 16/951* (2019.01); *G06F 16/953* (2019.01); *G06V 10/7715* (2022.01); *G06V 10/95* (2022.01)

(58) Field of Classification Search
CPC .. G06V 10/761; G06V 10/7715; G06V 10/95; G06F 16/951; G06F 16/953
See application file for complete search history.

(56) References Cited

U.S. PATENT DOCUMENTS

| | | | |
|---|---|---|---|
| 8,429,173 B1 * | 4/2013 | Rosenberg | G06F 16/5866 707/758 |
| 11,216,506 B1 * | 1/2022 | Ranzinger | G06F 16/56 |

(Continued)

FOREIGN PATENT DOCUMENTS

WO   WO-2020022956 A1 *   1/2020

OTHER PUBLICATIONS

E. Pizzi, S. D. Roy, S. N. Ravindra, P. Goyal and M. Douze, "A Self-Supervised Descriptor for Image Copy Detection," 2022 IEEE/CVF Conference on Computer Vision and Pattern Recognition (CVPR), New Orleans, LA, USA, 2022, pp. 14512-14522, doi: 10.1109/CVPR52688.2022.01413. (Year: 2022).*

(Continued)

*Primary Examiner* — Ross Varndell
(74) *Attorney, Agent, or Firm* — Kwan & Olynick LLP

(57) ABSTRACT

In some embodiments, a method receives query content that includes first visual data and select reference content that includes second visual data. A first visual feature mapping for the query content is generated using a model that is trained to generate visual feature mappings using content pairs where alterations in one instance of the content pair are used in the training. A second visual feature mapping is determined for the reference content. The second visual feature mapping is determined using the model. The method compares the first visual feature mapping and the second visual feature mapping to generate a score that rates a similarity between the query content and the reference content. The score is based on recognizing an alteration in one instance of the query content and the reference content. The score is output.

20 Claims, 6 Drawing Sheets

(51) Int. Cl.
*G06F 16/953* (2019.01)
*G06V 10/77* (2022.01)
*G06V 10/94* (2022.01)

(56) References Cited

U.S. PATENT DOCUMENTS

| | | | |
|---|---|---|---|
| 11,514,337 B1* | 11/2022 | Karpman | G06V 10/764 |
| 2016/0042252 A1* | 2/2016 | Sawhney | G06F 16/5838 |
| | | | 382/190 |
| 2016/0042253 A1* | 2/2016 | Sawhney | G06F 18/2323 |
| | | | 382/190 |
| 2020/0314507 A1* | 10/2020 | Yen | H04N 21/8358 |
| 2021/0365500 A1* | 11/2021 | Gunaselara | G06F 16/951 |
| 2022/0164643 A1 | 5/2022 | Charnock | G06N 3/04 |
| 2022/0198779 A1 | 6/2022 | Saraee | G06V 10/82 |
| 2022/0398538 A1* | 12/2022 | Jakobsson | H04L 9/3213 |

OTHER PUBLICATIONS

Sammani et al., "Visualizing and Understanding Self-Supervised Vision Learning," arXiv:2206.09753v1, Jun. 20, 2022. (Year: 2022).*
U.S. Appl. No. 18/525,628, filed Nov. 30, 2023, Inventor Dmitriy Karpman, Titled: "Training and Deployment of Image Generation Models", 63 pages.
U.S. Appl. No. 63/316,371, filed Mar. 3, 2022, Inventor Dmitriy Karpman.

* cited by examiner

DETECTING AND MONITORING UNAUTHORIZED USES OF VISUAL CONTENT

CROSS-REFERENCE TO RELATED APPLICATIONS

Pursuant to 35 U.S.C. § 119(e), this application is entitled to and claims the benefit of the filing date of U.S. Provisional App. No. 63/481,375 filed Jan. 24, 2023, entitled "DETECTING AND MONITORING UNAUTHORIZED USES OF VISUAL CONTENT", the content of which is incorporated herein by reference in its entirety for all purposes.

This application is related to U.S. Provisional Patent Application No. 63/316,371, filed on 3 Mar., 2022, which is hereby incorporated in its entirety by this reference.

This application is related to U.S. patent application Ser. No. 17/544,615, filed on Jul. 12, 2021, which is hereby incorporated in its entirety by this reference.

TECHNICAL FIELD

The present disclosure relates generally to the field of artificial intelligence and more specifically to new and useful systems and methods for visual similarity comparisons between user-designated content and web content within the field of artificial intelligence.

BACKGROUND

As digital content becomes easier to create, distribute, and share, it has become increasingly difficult for content platforms, rightsholders, and publishers to identify and limit unauthorized and/or unattributed uses of proprietary visual content (e.g., copyright infringement) on the Internet. Similarly, online platforms that host and provide access to large volumes of user-generated or user-uploaded content often lack accurate, repeatable, and scalable methods for identifying images and video that include content from proprietary (e.g., copyrighted) sources. Typical methods of comparing images may involve requiring a user to compare two images. However, with the scale of content that needs to be compared, this process is not realistic, practical, or accurate. Also, the two images may be manually input into a comparison engine. The comparison engine may then compare the images pixel by pixel. When there are a large volumes of user-generated or user-uploaded content, this method may not be scalable. The pixel by pixel comparison may also not provide optimal results because some content may be slightly altered, and this will affect the pixel by pixel comparison. Also, the comparison of images pixel by pixel may consume a large amount of resources and is time consuming.

DESCRIPTION OF THE EMBODIMENTS

Figure 1:
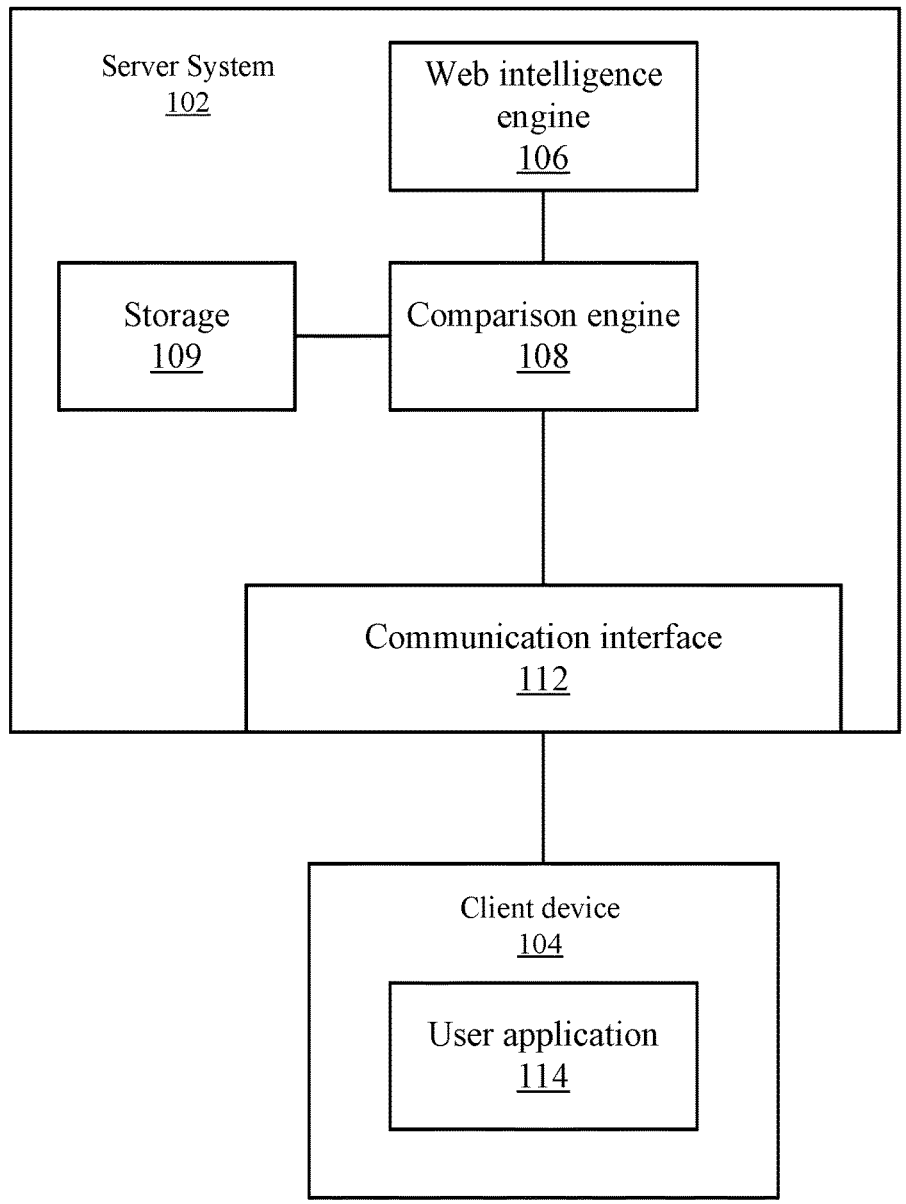
FIG. 1 depicts a system for comparing content according to some embodiments.

The following description of embodiments is not intended to limit the disclosure to these embodiments, but rather to enable a person skilled in the art to make and use the embodiments. Variations, configurations, implementations, example implementations, and examples described herein are optional and/or interchangeable and are not exclusive and/or limited to the variations, configurations, implementations, example implementations, and examples they describe. The embodiments described herein can include or define any and all permutations of these variations, configurations, implementations, example implementations, and examples.

A system, such as a local, distributed, and/or cloud-based computer system, may continuously ingest, download, and store and/or index content, such as images and videos hosted on the Internet; receive and index user-provided and/or user-designated content; and implement specialized computer vision, machine learning, and/or deep learning techniques to rapidly and accurately search these large-scale indexes (e.g., billions of images, tens of billions of images and/or videos) for visual matches to query content in response to user requests to identify duplicates, near-duplicates, derivatives and substantially modified instances of query content.

In particular, the system includes one or more artificial intelligence models (e.g., artificial neural networks or deep learning networks), referred to herein as a "perceptual similarity model", which may be trained according to aggregated (e.g., human and/or machine generated) judgements (e.g., labeling) of pairwise visual similarity between digital content (e.g., images and/or video) and corresponding augmented and/or computer-manipulated variants. The digital content may be referred to herein as "visual content", but other types of content may be appreciated, such as audio, text, etc. Visual content may include images and video. However, visual content may include different types of content, such as text, objects, symbols, etc. The system is configured to execute/implement efficient search and retrieval algorithms to compare query content (e.g., query images and/or video that are used to perform a query) to large indexes of reference content via the perceptual similarity model and return visual matches in near real time (e.g., within seconds). In some embodiments, executed in conjunction with a web index that includes a large number, (e.g., billions) of images and/or videos sourced from sources, such as public web domains (and/or mappings, embeddings, or other representations of these images or videos), the system enables comprehensive visual searches for matching or similar content on a network, such as the public Internet, to perform processes including, but not limited to: authenticating image uniqueness and/or originality against open web sources; identifying unlicensed or unauthorized uses of proprietary, copyrighted, or user-created visual media such as digital art, photography, and video assets on other websites or domains; and identifying sources for visual media that are suspected to be manually or programmatically edited, manipulated, and/or altered.

In other embodiments, the system can also leverage the perceptual similarity model to visually compare images accessed from webpages while building or adding the web index to sets of monitoring content, which may be high-value (e.g., copyrighted, commercially offered) images designated by users such as photo platforms, advertisers, or media companies. Specifically, the system can receive requests from users or user applications specifying monitoring content to monitor; analyze monitoring content via the perceptual similarity model; and construct a monitoring index including these images that are unique to each user. While assembling or adding to the web index via web crawling during operation, the system can: execute the perceptual similarity model on all accessed content accessed by the web crawler; compare perceptual (e.g., visual) features of these images to monitoring content stored in user monitoring indexes via (outputs of) the perceptual similarity model; and, in response to detecting a perceptual match with monitoring content in a user's monitoring index, immediately serve real-time alerts to users that identify web content that matches the monitoring content, thereby notifying users if, when, and where their (proprietary) visual content—or modified versions of that content—appears on web pages and enabling users to take appropriate enforcement actions.

In variations, the system, in conjunction with the perceptual similarity model, can also aggregate and index copyrighted or commercially viable video content, such as films, television shows, sports broadcasts, and user-generated video. In this variation, the system can additionally or alternatively leverage the perceptual similarity model to compare videos submitted by users (e.g., query videos that are used to perform query) to video content in this copyrighted content index in order to determine if the query video includes or reuses proprietary video content, even if the query video has been edited, visually modified, or uses a different file format, resolution, or codec. In response to identifying a matching reference video (e.g., above a predetermined similarity threshold), the system can then return identifying metadata, such as title, show name, episode number, studio name, rightsholder, etc. in near-real time, enabling the requesting user (e.g., a video hosting platform) to take immediate enforcement actions such as removing the query video or transmitting a copyright warning to the uploading user.

The use of the perceptual similarity model improves the technological process of comparing content. For example, the perceptual similarity model may be faster than using a human to compare images. Also, the perceptual similarity model can be scaled to compare large amounts of content at once. The results may also be more accurate and be able to detect visual alterations that may not be detectable by a human. Also, the perceptual similarity model may not perform a pixel by pixel comparison of images. Rather, the perceptual similarity model is trained to detect images that may be similar where some alterations have been introduced in one of the reference images compared to the query content. The perceptual similarity model is trained to detect these alterations and provide a similarity score that recognizes the alterations. In contrast, a pixel by pixel comparison may yield no match or a lower score when alterations are detected.

The system incorporates a communication layer (e.g., an application programming interface, hereinafter a "communication interface) interfacing between perceptual similarity model and/or content indexes and a set of (distinct) users, applications, or platforms. The system can leverage internal serving infrastructure to concurrently receive and process large numbers (e.g., hundreds or thousands) of query requests, such as on the web index, monitoring requests, and/or copyrighted content index, and serve (i.e., output) visual similarity results and matching visual content to requesting users in near-real time (e.g., within seconds).

System

FIG. 1 depicts a system 100 for comparing content according to some embodiments. System 100 includes a server system 102 and a client device 104. Server system 102 includes one or more computing devices that include processors and memory resources storing computer-executable instructions that define a web intelligence engine 106, a comparison engine 108, and storage 109.

Web intelligence engine 106 is configured to process and analyze content, such as content on a public or private network (e.g., the internet, intranets, etc.). Web intelligence engine 106 may include a set of web crawler software modules (hereinafter a "web crawler") configured to automatically review content, such as locate, fetch, ingest, and/or download image and/or video content hosted on public web pages.

Comparison engine 108 may include a prediction network that uses a model, which may be referred to as a perceptual similarity model, to analyze content. For example, comparison engine 108 may include: models, such as a set of machine learning, deep learning, and/or other artificial intelligence models, configured to determine similarity between content, such as to identify, quantify, detect human perceptuality similarity between images. The perceptual similarity model may improve the comparison process by performing the process faster than a pixel by pixel comparison because the perceptual similarity model does not need to compare each pixel of the images. Also, the perceptual similarity model may be able to detect alterations in an image and adjust a similarity score based on the alterations that are detected. For example, the perceptual similarity model may increase the similarity score to indicate that the images are more similar compared to if the alterations were considered different between the two images. In other words, the perceptual similarity model may be trained to recognize alterations and can provide a similar score for a first instance of query content that is not altered and a second instance of query content that has been altered. This type of detection improves the detection process by making the process resilient to changes in content.

Storage 109 may store retrieved content and information about the content. For example, storage 109 may include a repository, database, and/or index of images and/or video hosted on the web (hereinafter the "web index"). In some embodiments, storage 109 is configured to store visual content accessed by the web intelligence engine 106 and/or visual feature mappings generated by executing a perceptual similarity model on visual content accessed by the web intelligence engine 106. In some embodiments, the comparison engine 108 also includes a set of monitoring indexes that store user-provided image and/or video files (or visual feature mappings/embeddings of these files generated by the perceptual similarity model).

Generally, the system also includes a communication interface 112 (e.g., a programmatic interface, such as an application programming interface or API) connecting the comparison engine to a client device 104 running a user application 114. For example, client device 104 may be external to system 102 and running external user (e.g., client) applications and/or platforms. Specifically, the communication interface 112 is configured to: receive and process external (e.g., user) query requests and pass (e.g., transmit) query content, such as images and/or or query video, to the comparison engine 108; receive and process external (e.g., user) monitoring requests on user-provided reference images or sets of reference images and pass (e.g., transmit) these reference images to the comparison engine 108 (e.g., for indexing and storage in a monitoring index associated with the user); output/serve alerts or notifications visual similarity results from the comparison engine 108, including matching visual content, identifiers for matching visual content, and/or perceptual similarity model predictions to users or user applications or platforms in response to these requests. In implementations, the communication interface 112 defines a set of communication endpoints, each of which interface between the comparison engine 108 and client devices 104, such as a distinct user, application, platform, and/or project, thereby enabling the system to receive, process, and serve results for requests, queries, and/or tasks submitted by multiple (unrelated) users in parallel. In one implementation, the communication interface is configured to receive the monitoring request as a direct API call to an HTTP endpoint (e.g., made a programmatically by a user or automatically in response to events in client application). Additionally or alternatively, the communication interface can include a user-facing software application layer enabling a user to submit the monitoring request by specifying the monitoring image or video via a link or direct file upload at a user interface, dashboard, or user portal.

Method

The comparison may be performed using different processes at different times. The terms query content and reference content is used. The query content may be an instance of content in which similar copies is being searched in reference content. At different times, content may be query content and then treated as reference content. For example, a query may be received with query content, and that query content is compared against web content in a web index. Further, the query content may be stored in a monitoring index. Then, as new web content is found, the web content is used as query content against the monitoring index. Thus, the original query may become reference content when new web content is found and used as query content.

Figure 2:
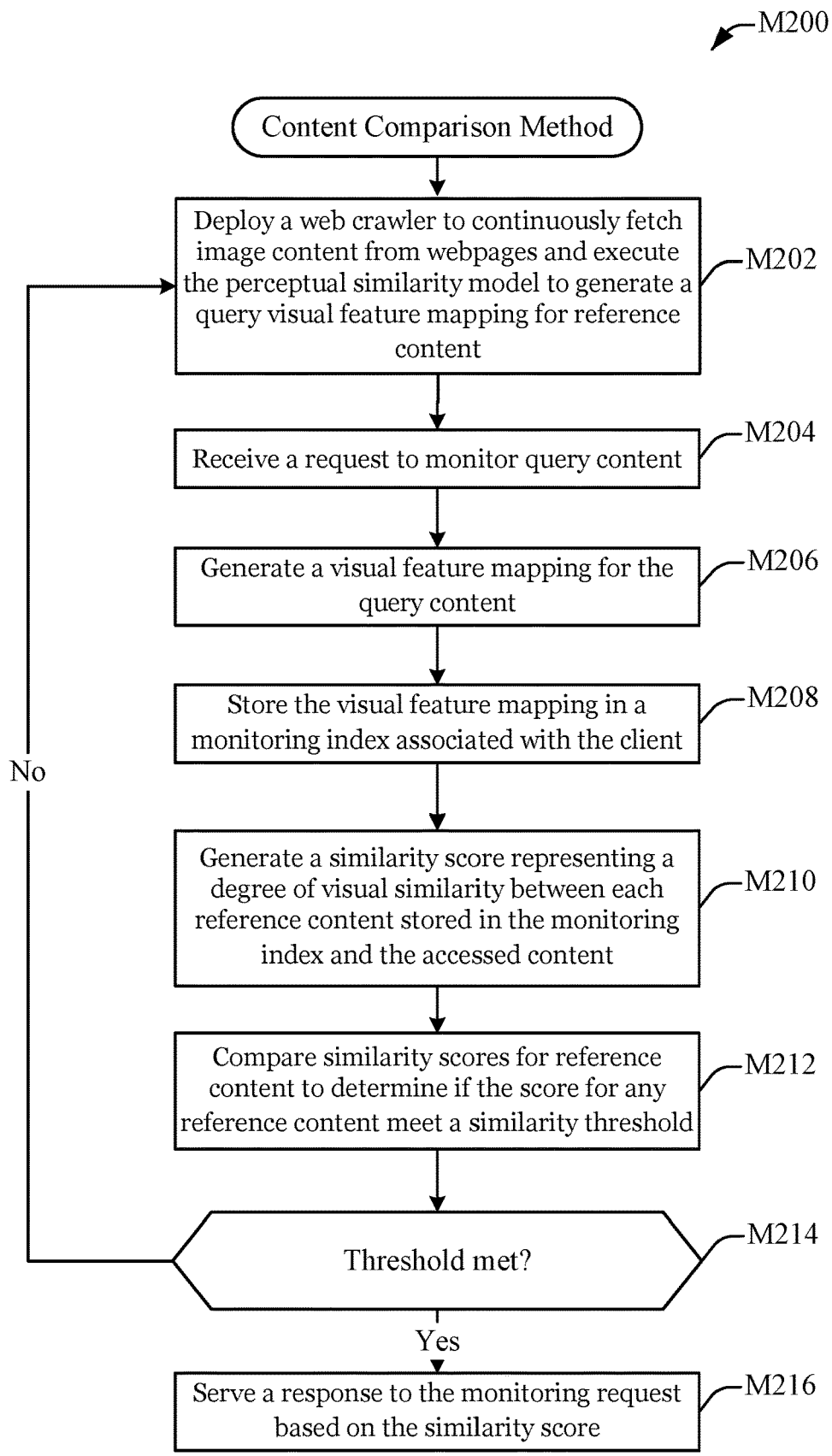
FIG. 2 depicts a simplified flowchart of a method for comparing content according to some embodiments.

FIG. 2 depicts a simplified flowchart 200 of a method for comparing content according to some embodiments. At Block M202, server system 102 deploys a web crawler to continuously fetch image content from webpages; and for each fetched web image, executes the perceptual similarity model to (i) generate a visual feature mapping for the reference content.

When the query is first received, the query content is compared against content that exists in a web index. At Block M204, at a first time, server system 102 receives, via a communication interface 112 associated with a first client device 104, a request to monitor query content, which may be a set of images or a video. At Block M206, using a perceptual similarity model, server system 102 generates a visual feature mapping for the query content. The visual feature mapping may represent the query content. At Block M208, server system 102 stores the visual feature mappings in a monitoring index associated with client 104. The monitoring index stores queries that were received from client devices 104.

At Block M210, over a second period of time, such as after the first time, server system 102 generates a similarity score representing a degree of visual similarity between the query content and each reference content, such as that stored in the web index. At Block M212, server system 102 compares similarity scores for reference content to determine if the score for any reference content meets a similarity threshold. At Block M214, in response to a first similarity score for a first accessed image exceeding a similarity threshold, server system 102 serves, via the communication interface 112, a response to the monitoring request based on the similarity score. For example, the response may include a link to the reference content, a set of backlinks to web pages hosting the accessed content, and the similarity score between the reference content and the query content. If there are multiple instances of reference content that meet the threshold, the results may include information for those instances of reference content.

At M214, if no scores meet the threshold, the process reiterates to M202 to search for additional reference web content over a next period of time. When this process continues, any retrieved web content is treated as the query content and the content in the monitoring index is treated as reference content. That is, the new web content is compared to content that is being monitored to detect if similar content is detected. This allows for the continuous monitoring of content.

The method M100 and its variations are described herein as being implemented by a distributed computer network in conjunction with a perceptual similarity model and one or more indexes of reference content. However, these methods can also be implemented by a local computer system, a peer-to-peer computing network, a cloud computing system, or any other suitable computer architecture to implement model-based comparisons of visual query content to a large index of content, such as web images, web videos, and/or proprietary video content, compare query content to content fetched via web crawling, and serve responses and alerts with results to users.

Web Intelligence Engine

Web intelligence engine 106 may determine reference content that is compared to query content. Web intelligence engine 106 defines a set of software modules configured to execute web crawling algorithms to access content stored on a network. For example, web intelligence engine 106 may locate, access, collect, and/or store content from sources, such as image data from web pages. Starting from an initial set of (e.g., random) seed location identifiers, such as uniform resource locators (URLs), web intelligence engine 106 can automatically (e.g., without further user input or instruction) analyze content from the location identifiers. For example, web intelligence engine 106 can automatically: analyze webpage contents (e.g., via text or HTML descriptions) to identify and locate any images hosted on each webpage; fetch, download, and/or scrape hosted image content (i.e., image files, video files); identify, download, and/or generate descriptive metadata associated with each accessed image or video (e.g., image URLs, backlinks to host pages, alternate text associated with the image); and then identify and follow hyperlinks to other pages. Web intelligence engine 106 can continuously repeat this process throughout operation of system (e.g., starting with additional random seeds) in order to find and access previously uncrawled pages, fetch additional images and videos from newly accessed webpages, and re-crawl previously accessed pages for new visual content.

For each instance of content, such as web image or video, that is accessed, fetched, and/or downloaded by web intelligence engine 106, server system 102 can use the perceptual similarity model to analyze the content to generate a visual feature mapping of the content, which can be stored a web index of the content. The visual feature mapping may be a representation of the content in a higher dimensional space. For example, comparison engine 108 can: execute the perceptual similarity model to generate a visual feature mapping of the web image or video in an embedding space (e.g., high-dimensional vector space); compare the visual feature mapping to visual feature mapping of designated reference images and/or video stored in a monitoring index; and/or store the visual feature mapping and descriptive metadata (e.g., image URLs, domain information) in the web index in order to enable model-based comparisons to query image content in response to image similarity search requests received at the communication interface. In some implementations, the system can additionally (or alternatively) store the image file itself in the web index or a related index, thereby enabling the visual feature mapping of previously fetched images to be re-generated in the event that the perceptual similarity model is updated, re-trained, or replaced with a similar model at a later time.

In some variations, server system 102 also includes a content moderation model that includes a set of visual (e.g., image) classifiers configured to screen content, such as web images and video, fetched by web intelligence engine 106 for undesirable subject matter, such as visual subject matter, prior to downloading, indexing, and/or storing the image in the web index. In one implementation, the content moderation model is a pre-trained machine learning, deep learning and/or other artificial intelligence models trained or otherwise configured to identify specific types of sensitive, inappropriate, and/or harmful visual subject matter in image and video content. More specifically, the content moderation model can include a first visual classifier (e.g., a first model head) within the content moderation model that can be configured to identify, detect, and/or flag sexually explicit content such as nudity and pornographic material, a second visual classifier (e.g., a second model head) within the content moderation model that can be configured to identify violent subject matter such as gore, weapons, etc., and so on. The system can deploy and/or execute the content moderation model to classify web images (e.g., as "safe" or "not safe") accessed by web intelligence engine 106 in order to determine whether the image is appropriate to be included, indexed and/or stored in the web index, thereby enabling web intelligence engine 106 to crawl across a broader (e.g., unrestricted) range of webpages without restricting crawling and image indexing processes to reputable, safe, and/or known websites.

By continuously analyzing content, such as crawling, ingesting, and indexing additional images, web intelligence engine 106 can therefore construct, maintain, and update the web index as a comprehensive repository of (unique) content, such as web images (e.g., a large number, such as billions of images, tens of billions), to enable comprehensive image similarity searches on the content, such as existing open web content, via the perceptual similarity model. Additionally, server system 102 can automatically execute the perceptual similarity model to perform visual comparisons between content, such as images and videos, fetched by web intelligence engine 106 and user-provided query content (e.g., copyrighted, proprietary, or branded images or video) in one or more monitoring indexes, and serve near-real time alerts to corresponding users via communication interface 112 in response to identifying a match between an visual content encountered by web intelligence engine 106 during crawling and query content within a monitoring index.

Comparison Using Perceptual Similarity Model

Comparison engine 108 is configured to receive a query and analyze query content of the query to generate a visual feature mapping. Then, comparison engine 108 is configured to compare the visual feature mapping for the query content to visual feature mappings of reference content to determine similarity between the query content and the reference content. The output of the comparison may be a similarity rating between the query content and the reference content. For example, comparison engine 108 is configured to: receive query content (e.g., an image specified in a similarity search query or monitoring request); perform computer vision or deep learning techniques to generate a visual feature mapping of the query content; compare this visual feature mapping to visual feature mappings of a set of reference content; and output and/or return determinations, predictions, or metrics of human perceptual (e.g., visual) similarity between the query image and these reference images based on correlations between these visual feature mappings, thereby enabling the system to perform visual similarity searches against (large) reference sets (i.e., the web index and/or monitoring indexes) and identify and return high-similarity matches.

In some embodiments, the perceptual similarity model defines a pre-trained artificial neural network—such as a convolutional neural network, a vision transformer, a deep learning network, or a residual learning network—configured to generate visual feature mappings, which may be a representation of the input (e.g., embeddings, and/or encodings of abstract visual features of an image) in a high-dimensional vector space. The perceptual similarity model may derive correlations between different visual feature mappings (i.e., of different images and/or videos) according to weights, paths, and connections between network layers that have been learned, inferred, and/or derived through analysis of training data during a training stage. In some embodiments, the perceptual similarity model can then quantify a degree (e.g., amount) of visual similarity between query content and reference content based on these correlations (e.g., a Euclidean distance, cosine similarity, maximum inner product, or similar metric between visual feature vectors in high-dimensional feature space) and generate a corresponding similarity score (e.g., result, metric) between an image and/or video pair based on a difference determined. For example, the similarity score can be a decimal (i.e., float) value normalized between 0.0 (representing that the two images are visually distinct) and 1.0 (representing an exact visual match between the image and/or video pair), thereby enabling comparisons to a pre-defined or pre-calculated similarity threshold in order to efficiently distinguish between perceptually matching visual content and visually distinct images or videos.

The perceptual similarity model may be trained in different ways. In one implementation, the training dataset for the perceptual similarity model is supervisory training data that defines a (large) set of labeled image pairs, each including: a basis image; a comparison image; and a label or annotation representing a human annotator's judgement of visual similarity between the basis image and the comparison image (e.g., "unrelated/visually distinct," "visually similar/same instance/same object," or "visually identical/exact visual match/same image"). Additionally or alternatively, the supervisory training data can include training image sets that have been labeled by another pre-trained image similarity model. The supervisory training data may additionally or alternatively include video data or graphic interchange (i.e., GIF) data.

In another implementation, the perceptual similarity model is additionally or alternatively trained by unsupervised techniques, such as contrastive learning or other self-supervised training algorithms, in which image and/or video pairs (or image sets) are not labeled according to pre-made similarity determinations. In this case, the perceptual similarity model can ingest a large set (e.g., hundreds of thousands of images) of images and/or videos and perform and/or analyze combinations of (augmented) input image and/or video pairs to automatically learn an appropriate visual feature/embedding space via loss minimization, cosine similarity, or other suitable training objectives.

In the above implementations, the comparison image(s) or videos can be altered versions, such as edited, altered, augmented, or otherwise manipulated versions, of the basis image or video. For example, these augmented images or videos can include cropping, rotations, mirror effects, superposition onto other images, filters, blurring, pixelation, Gaussian noise, and AI-generated effects or visual reproductions. The altered versions may train the perceptual similarity model to detect similarity between query content and altered versions, and provide a similarity score that is representative of the similarity taking the alterations into account. For example, the similarity score may be similar to a score for an unaltered version, or increased or higher from a score that takes the alterations into account, even though alterations are detected compared to a pixel by pixel comparison.

In implementations where the perceptual similarity model is trained according to contrastive learning or other self-supervised methods based on progressive visual augmentations, these training datasets may be programmatically pre-processed and/or cleaned to identify and remove duplicate basis data (i.e., images or videos that would be considered similar before adding augmented variants). More specifically, the training set can be analyzed by a set of different visual similarity tools and/or models to identify any highly similar (or identical) images included in the training set. For example, the system can execute image hashing algorithms to identify exact file matches (e.g., identical images) within the training set by SHA-256 hash, MP5 hash or other suitable output. Subsequently, the system can: execute one or more separate, pre-trained image similarity models (e.g., a perceptual similarity model trained at an earlier stage of the model development process) on the training set to generate representations (e.g., visual feature mappings) of the training images or videos in embedding spaces; execute or implement a graph selection or other suitable algorithms to identify subsets of similar images within the training set; and selectively remove and/or knock out one or more images in these subsets to create (e.g., open up) larger distances between remaining images in the embedding space. By identifying and selectively removing similar (or identical) basis images and/or videos in the training set prior to generating and/or training on augmentations of basis content, the system can therefore remove (potentially) contradictory training examples while preserving the greatest number of training examples in order to increase the robustness and/or performance of the perceptual similarity model after training.

Generally, the perceptual similarity model learns, derives, or infers visual feature mapping and/or selection techniques (i.e., embedding space) through a multi-stage, progressive training regimen. For example, during a first training interval, the perceptual similarity model can learn, derive, or infer an initial set of weights by analyzing a small set of training data (e.g., one thousand image pairs) featuring lightly augmented visual content pairs (e.g., introduction of small amounts of noise, slight Gaussian blur). Then, during a second, subsequent training interval, the perceptual similarity model can update the initial set of weights by analyzing to larger set (e.g., ten thousand image pairs) of supervisory training data that includes visual content pairs under more substantial (i.e., visually noticeable) augmentations. This process can be repeated with larger image sets and/or heavier augmentations to expose the perceptual similarity model to progressively more "difficult" inputs and/or modifications that may preserve (i.e., do not change) human evaluations of visual similarity (e.g., during labeling and/or construction of the training set, in evaluations of model results). Through additional inclusion of negative examples in the training data and by employing contrastive loss or similar training techniques, the perceptual similarity model can learn, build, and develop custom weights, paths, and/or connections within the network architecture that align with and/or mimic human visual heuristics, thereby enabling highly accurate predictions of visual similarity between visual content pairs and/or sets that are resilient to image editing and augmentations that would go undetected by deterministic (e.g., cryptographic) approaches such as image hashing comparisons.

In some implementations, the perceptual similarity model defines multiple sub-models, such as two distinct sub-models: an exact visual match sub-model and a visual likeness sub-model. Generally, the exact visual match sub-model and the visual likeness sub-model share a similar (or identical) model architecture but are trained according to (slightly) different ground-truth definitions of visual similarity through use of different pre-training stages, fine-tuning, active learning, and/or non-identical training data.

More specifically, the visual likeness sub-model can be trained, fine-tuned, or otherwise configured to generate (e.g., compute, derive, predict) a high similarity score (e.g., greater than 0.9) between a query image or video and a reference image or video that has been noticeably (i.e., visibly) augmented or transformed. For example, the visual likeness sub-model can identify a reference image as highly similar to a query image even if either image has been subject to substantial visible alterations such as resizing, rotations, recolorations (e.g., filters), noticeable blurring and/or differences in resolution, addition of overlay elements such as text or other graphics, transposing (e.g., "photoshopping") onto or into another image, or other augmentations. Thus, the visual likeness sub-model can detect instances in which the reference content has been substantially modified or appears within the query content, thereby enabling the system to detect reuse of the reference image within a figure, graphic, advertisement, or a similar context.

Conversely, the exact visual match sub-model can be trained, fine-tuned, or otherwise configured to generate (e.g., compute, derive, produce) a high similarity score (e.g., greater than 0.9) between a query image (or video) and a reference image (or video) only if a human would classify the two images as (nearly) visually indistinguishable, and generate a low similarity score (e.g., less than 0.5) if either image has been visibly altered. For example, the exact visual match sub-model can identify a reference image as highly similar to a query image if: the two image files are exactly the same; the two images are the same but use different file formats, resolution, and/or compression; and/or either image has been subject to visually subtle (e.g., imperceptible) pixel-level cropping, translation, or rotations, subtle image filters, or introduction of small amounts of noise, Gaussian blur, or other adversarial augmentations. Thus, exact visual match sub-model operates according to a narrower ground-truth definition of visual similarity while also capturing subtle augmentations or differences that may change the image hash or video hash (and therefore bypass other image comparison methods) but do not result in identifiable visual differences. The identifiable visual differences may result in lower similarity scores. The visual likeness sub-model and exact visual match sub-model may be used in different ways. For example, the visual likeness sub-model and exact visual match sub-model may be used together, and the scores that are output may be combined, or averaged. Alternatively, one score of the visual likeness sub-model and exact visual match sub-model may be selected. For example, if alterations are detected, the visual likeness sub-model score may be used. Also, only one of the visual likeness sub-model or exact visual match sub-model may be used. For example, if alterations are detected, the visual likeness sub-model is just used. However, if no alterations are detected, only the exact visual match sub-model is used.

Perceptual Similarity Model

In some embodiments, the perceptual similarity model may receive query content and reference content, generate visual feature mappings of the query content and the reference content, derive correlations between different visual feature mappings, and compare the visual feature mappings. In other embodiments, the perceptual similarity model may receive query content, generate visual feature mappings of the query content, receive reference visual feature mappings from an index (e.g., visual feature mappings that were previously generated), derive correlations between different visual feature mappings, and compare the visual feature mappings. The use of the index may increase the speed of comparison when comparing query content to a large volume of reference content.

Figure 3:
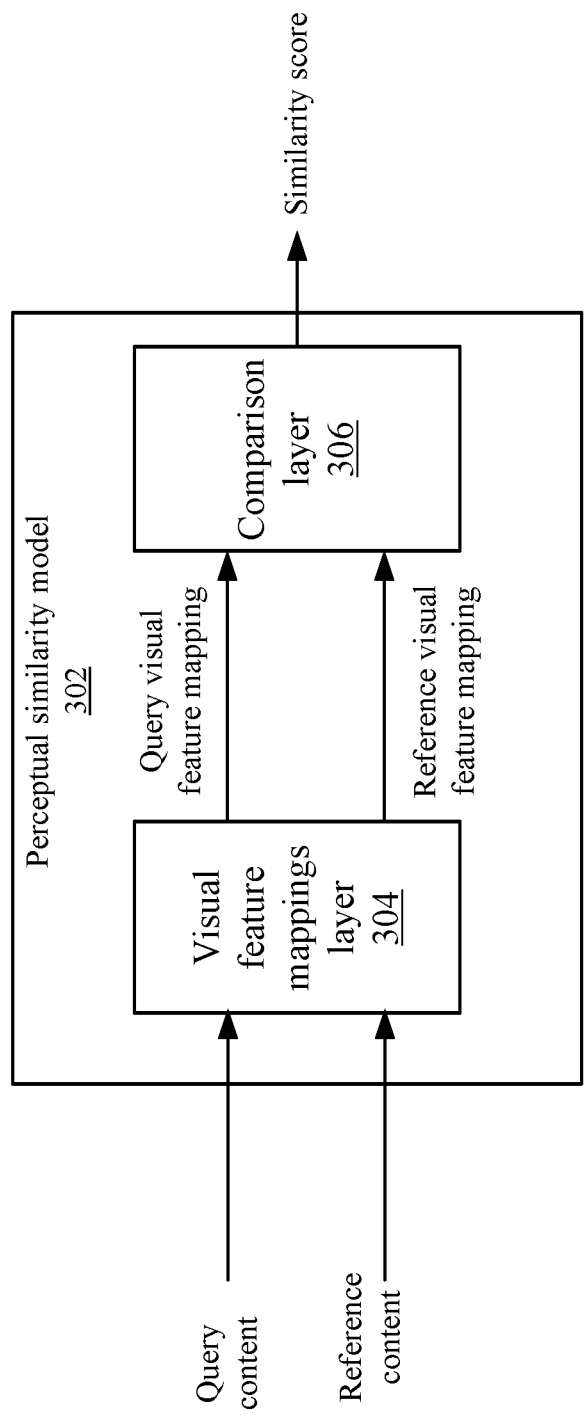
FIG. 3 depicts a first example of using perceptual similarity model according to some embodiments.

Perceptual similarity model may be used differently. For example, a pair of query content and reference content may be input into perceptual similarity model. As will be described below, visual feature mappings may be input into the perceptual similarity model instead of reference content. FIG. 3 depicts a first example of using perceptual similarity model 302 according to some embodiments. A visual feature mappings layer 304 receives input and generates a visual feature mapping for the input. In some embodiments, the input may include query content and reference content. The similarity score may rate how similar the reference content is to the query content. As will be discussed below, the query content may be received from different sources, such as from client device 104 as a query, from content crawled from the web, or other sources. The reference content may also be different content, such as content from the web, content that is being monitored for client devices 104, etc.

Visual feature mappings layer 304 may analyze the query content and the reference content to generate a query visual feature mapping for the query content and reference visual feature mapping for the reference content. Additionally, perceptual similarity model 304 may derive any correlation between the reference content and the query content that may improve the similarity score. For example, the correlations may be detect on alterations that may have been made to either the query content or the reference content. The trained parameters of visual feature mappings layer 304 may output the visual feature mappings based on the parameters that were trained as described above.

Comparison layer 306 may compare the query visual feature mapping and the reference visual feature mapping to generate a similarity score. Although comparison layer 306 is shown in perceptual similarity model 302, functions or logic of comparison layer 306 may be separated from perceptual similarity model 302 in FIG. 3 or FIG. 4. The trained parameters of comparison layer 306 may output the score based on the values of the query visual feature mapping and the reference visual feature mapping. Comparison layer 306 may use the derived correlations to generate the similarity score. For example, the comparison may generate a high similarity score when one of the query content or the reference content has been noticeably (i.e., visibly) altered. The above comparison may be run for each reference content that is to be compared to the query content.

Figure 4:
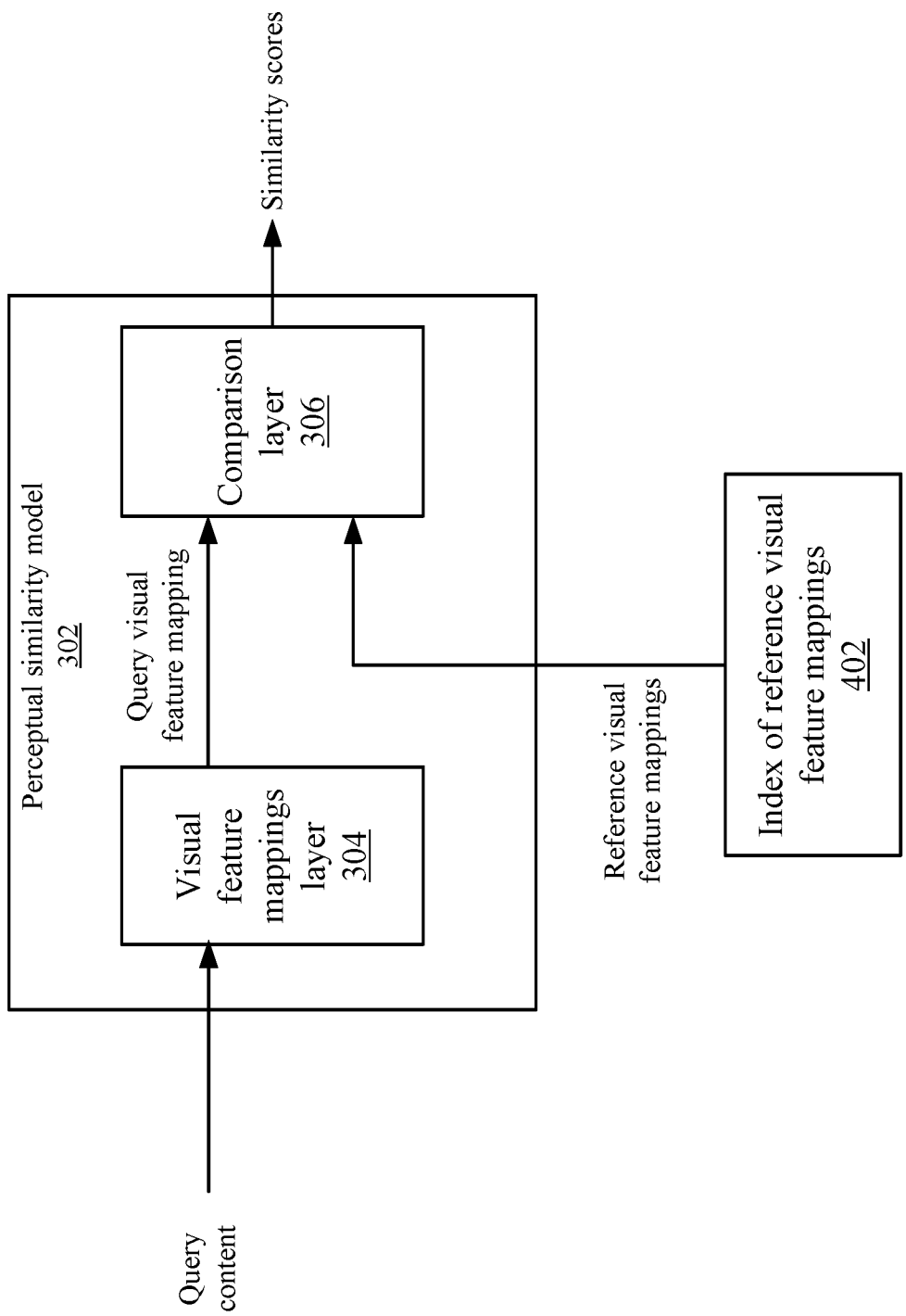
FIG. 4 depicts a second example of using the perceptual similarity model according to some embodiments.

There may be instances where a large volume of content is compared to query content. In this case, an index of visual feature mappings may be input into perceptual similarity model 302. FIG. 4 depicts a second example of perceptual similarity model 302 according to some embodiments. Visual feature mappings layer 304 receives input and generates a visual feature mapping for the input. In some embodiments, the input may include query content and not reference content.

Comparison layer 306 receives the reference visual feature mappings from an index of reference visual feature mappings 402. The index may include reference visual feature mappings from content that was downloaded from the web (e.g., the web index), content that was submitted for monitoring by client devices 104 (e.g., the monitoring index), etc. Comparison layer 306 may compare the query visual feature mapping and each reference visual feature mapping to generate a similarity score. The comparison may be similar to that described in FIG. 3. Comparison layer 306 may perform multiple comparisons, such as comparisons between the query content and each reference visual mapping to output the similarity scores.

Index and Comparison

Index of reference visual feature mappings 402 may include a web index configured to store content, such as images and/or videos, fetched by web intelligence engine 106 and/or visual feature representations of the content generated by perceptual similarity model 302 that can be accessed, searched, or retrieved by the comparison engine 108 in response to query requests received at the communication interface. Generally, the web index may also store metadata for each image, video, GIF, etc. (i.e., visual content) retrieved and/or generated by web intelligence engine 106 during crawling, including a link (e.g., URL) to the image file, a backlink to the webpage(s) hosting the visual content, a hash (e.g., SHA-256 hash, MP5 hash) of the visual content, alt text associated with the image on the webpage, etc., which can then be accessed returned via the communication interface In one implementation, the web index defines a large-scale data structure (e.g., a nearest-neighbor graph, a matrix) configured to store, sort, and/or index large numbers (e.g., billions) of visual feature mappings of crawled images or videos (generated by the perceptual similarity model 302) according to suitable pre-processing, partitioning, and encoding algorithms. In this implementation, the web index is defined and/or implemented in RAM memory to enable rapid indexing and similarity searches, although solid state memory, ROM memory or other suitable storage mediums can additionally or alternatively be used.

In this implementation, comparison engine 108 can be configured to execute various vector processing operations and/or algorithms on visual feature mappings (e.g., vectors) generated by perceptual similarity model 302 to reduce the memory footprint of each vector and increase computational efficiency of similarity searches. For example, the system can implement principal component analysis to reduce the number of dimensions in each vector, sort vectors according to Euclidean norm, rotate or otherwise transform vectors for more efficient encoding, and/or pad vectors to standardize up to a target dimension. When constructing the web index and adding new visual feature mappings as web intelligence engine 106 retrieves additional images and/or videos, the system can also implement inverted file indexing algorithms to sort and/or partition the set of vectors into clusters or folds of similar vectors to support non-exhaustive searches, as described below (e.g., searching only within the cluster that is most similar to the query vector to increase speed and reduce complexity). Additionally, the system can include a quantizer or similar module to compress or otherwise reformat vectors prior to indexing, thereby reducing the web index's memory size and enabling faster search speeds. More specifically, the system can apply scalar quantization and/or product quantization to encode each vector with lower precision or binarize vector indices to further reduce memory footprint prior to indexing the vector in the web index.

Index of reference visual feature mappings 402 can additionally or alternatively include a set of monitoring indexes to store user-designated reference content (e.g., received from client devices 104), such as images and/or videos (e.g., copyrighted, branded, premium, or otherwise propriety content), and/or visual feature mappings for reference visual content according to similar methods and techniques, thereby enabling model-based comparisons of the reference content to web content retrieved, at a later time, by web intelligence engine 106.

Upon receiving a set of reference content, such as images and/or videos (i.e., one image, ten images, ten thousand images), via the communication interface, comparison engine 108 can execute perceptual similarity model 302 on each reference image and/or video to encode visual features of the reference visual content as a many-dimensional vector (i.e., feature vector) in the image embedding space learned by perceptual similarity model 302 during training. For each reference image or video, perceptual similarity model 302 can implement computer vision, deep learning, and/or artificial intelligence techniques to extract and encode visual features the model has previously inferred—for example, through self-supervised analysis of training data, through hard-coded feature selection algorithms, through analysis of labeled training data—to be correlated with and/or dispositive of human perceptual determinations of image characteristics and/or visual similarity.

More specifically, perceptual similarity model 302 can: implement and/or execute edge detection, blob extraction, autocorrelation, thresholding, or other suitable computer vision techniques on an image to identify (e.g., extract) first-order visual features (e.g., lines and areas) and higher-order visual features (e.g., edge orientations, corners, gradients); and encode, embed, and/or represent these visual features (e.g., tens of features, thousands of features) as structured, high-dimensional objects (e.g., vectors, deep representations) in an abstract embedding space (e.g., vector space), graph, matrix, or other suitable data structure. Perceptual similarity model 302 can therefore generate a highly descriptive "visual fingerprint" for each image and/or video transmitted to/by the communication interface. The above process may also be performed for content fetched by web intelligence engine 106 during crawling.

For reference images received via monitoring requests, comparison engine 108 can then index, store, and/or add the visual feature mapping to a monitoring index associated with the requester's endpoint. For example, comparison engine 108 can route the reference visual content and/or visual feature mappings of these references generated by perceptual similarity model 302 to the corresponding monitoring index based on an identifying token used to authenticate the monitoring request to the communication interface or according to a user identifier associated with the API endpoint transmitting the request. In some implementations, comparison engine 108 can construct or define multiple (e.g., five, twenty, 100) separate monitoring indexes, thereby enabling each different user (e.g., applications, websites, platforms, customers) to add images and/or videos to a unique, private reference index of specific images of interest to compare—using perceptual similarity model 302—against visual content accessed and retrieved by web intelligence engine 106 during crawling. For example, administrators of a different stock photo or content platforms can designate copyrighted or proprietary content they wish to monitor for unlicensed, unpaid, or unattributed use on other webpages to their own, separate monitoring indexes to be (individually) notified if content encountered by web intelligence engine 106 matches entities in their specific index.

Over time, comparison engine 108 can add additional images and/or videos (and therefore visual feature mappings of additional visual content) to a monitoring index in response to subsequent monitoring requests received at the communication interface, or remove outdated or otherwise unneeded reference content from the monitoring index, thereby enabling users to maintain an up-to-date reference index of content of interest as a basis for model-based visual similarity comparisons to images and/or videos retrieved by web intelligence engine 106. In implementations where the monitoring index stores visual feature mappings of visual content in each monitoring index (e.g., instead of or in addition to the files themselves), the underlying file provided in the monitoring request can be deleted or discarded after processing by perceptual similarity model 302 in order to comply with data privacy or data retention needs of user applications, websites, or platforms.

Comparison engine 108 may join the web index and/or one or more monitoring indexes with perceptual similarity model 302 to enable visual similarity comparisons of query content to the web index and/or monitoring index. In implementations, comparison engine 108 includes and/or recruits one or more graphics processing units ("GPUs") or GPU clusters in order to execute perceptual similarity model 302 on query content or reference content, process and index visual feature mappings generated by perceptual similarity model 302, and execute parallel, multi-threaded search, comparison, and/or retrieval operations over the web index and monitoring index(es) based on query content, thereby enabling rapid and accurate visual similarity searches according to parameters of perceptual similarity model 302.

The following may perform a retrospective visual search or a forward looking visual search. The retrospective visual search may receive query content and compare the query content to the web index. The forward looking visual search may use query content as reference content in the monitoring index. Then, when new web content is retrieved, that content is used as query content and compared to the monitoring index.

Retrospective Visual Search

In some implementations, after receiving a monitoring image or video (or "query content") specified in a monitoring request, the system can query the web index for visual (e.g., perceptual) matches to the query content and return links to any visual content represented in the web index that matches the query content (e.g., as determined by outputs of perceptual similarity model 302) via the communication interface. Once perceptual similarity model 302 has generated a visual feature mapping of the reference content, the system can: input the visual feature mapping of the query content as one or more queries (e.g., query vectors) to perceptual similarity model 302; execute an image similarity search algorithm over the web index to derive correlations between the visual feature mapping of the query content and visual feature mappings of images and/or videos stored in the web index (e.g., all images in the web index, a subset of images in the web index); and generate visual similarity metrics (e.g., a similarity score) between the query content and reference content in the web index. The system can then compare this set of visual similarity metrics to a similarity threshold (e.g., a threshold similarity score) and return any matching reference content, such as images and/or videos, in the web index and/or identifying metadata for matching content (e.g., image URL, webpage URL) that exceed the similarity threshold, thereby notifying the requester that the query content (i.e., the monitoring image or video submitted for monitoring) exists on one or more (other) webpages.

For example, perceptual similarity model 302 can implement a specialized k-nearest neighbors search, k-selection, or other suitable algorithm optimized for the indexing scheme of the web index on a distributed multi-GPU architecture in order to increase search speed. In one implementation, perceptual similarity model 302 can compare the query visual feature mapping of the reference image or video to each visual feature mapping stored in the web index and identify k (e.g., three, ten, one hundred) stored visual feature mappings that are most similar to the query visual feature mapping according to Euclidean distance, cosine similarity, scalar product, vector product, and/or other correlation metrics. In this implementation, perceptual similarity model 302 conducts an "exhaustive" search that compares the query image against every image represented in the web index according to outputs of perceptual similarity model 302, thereby increasing the accuracy (e.g., recall) of the similarity search. In another implementation in which the web index is partitioned into clusters of similar visual feature mappings, perceptual similarity model 302 can alternatively conduct a "non-exhaustive" search over the web index that analyzes only a subset of stored visual feature mappings. More specifically, perceptual similarity model 302 can: compare the query visual feature mapping to a centroid (e.g., centroid vector) of each cluster defined in the web index; identify the centroid that is nearest to the query visual feature mapping in embedding (e.g., feature) space based on Euclidean distance, cosine similarity, other suitable correlation metric; and return the k most similar visual feature mappings within only that cluster (i.e., ignoring all other clusters). Thus, perceptual similarity model 302 can search a subset of the web index that is most likely to contain a (vast) majority of visual matches to the query image or video in order to (greatly) increase similarity search speed while maintaining acceptable accuracy, thereby enabling near-real time image similarity searches across large (e.g., billion-scale) indexes of visual content.

In accordance with query results, perceptual similarity model 302 can then generate a similarity score or other similarity metric based on correlations between the query visual feature mapping and each matching visual feature mapping in the web index (e.g., the k nearest vectors). For example, the similarity score can be a (normalized) scalar product between the query visual feature mapping and a matching visual feature mapping, such as decimal value between 0 and 1 that reflects the degree of visual similarity between the values of the query visual feature mapping and a matching visual feature mapping. The degree of similarity may be based on a measurement of distance between values of the query visual feature mapping and a matching visual feature mapping. The score may be adjusted based on alterations that are detected. For example, some variations in the score may be attributed to alterations from the correlations determined from perceptual similarity model 302.

In response to one or more of these similarity scores exceeding a similarity threshold (e.g., 0.5, 0.9), server system 102 can output, via the communication interface 112, a response, such as an alert, and/or notification, to the requester that includes the similarity score, and (i) any above-threshold matching images and/or metadata identifying these matching images (e.g., links to the images, backlinks to webpages that host the images), thereby enabling the user to locate the matching image on the internet and take appropriate automatic or manual enforcement actions, such as serving a notice of copyright violation to the domain owner or removing user-generated content that includes the (copied) query image from the user platform, website, or application.

In some embodiments, communication interface 112 also includes query endpoints—separate from endpoint(s) handling monitoring requests—that enables client devices 104 to query the web index for matches to specified query content (e.g., query images) directly. In this variation, server system 102 can: at a first time, receive and process, via the communication interface 112 (e.g., an API), a request specifying query content, such as a query image or video (e.g., a link the query image, a direct file upload of the query image); execute perceptual similarity model 302 on the query content to (i) generate a query visual feature mapping, (ii) compare the query visual feature mapping against the web index according to the method(s) described above, and (iii) generate similarity scores between the query image or video and reference content stored in the web index based on correlations between the query visual feature mapping and visual feature mappings represented in the web index (e.g., generated by perceptual similarity model 302 when the reference image was indexed). In response to similarity scores for one or more reference images (or other similarity comparison result) exceeding a similarity threshold, server system 102 can then output, at approximately after the first time (e.g., within seconds of receiving the request), a response to the request via the communication interface 112 that includes similarity scores, and matching reference images and/or videos, and/or identifying metadata for the matching reference images for each matching reference image. For example, the identifying metadata can include a link to the reference image file, backlinks to web pages where the reference content was accessed by web intelligence engine 106, alt text for the reference content on these webpages, a cryptographic hash of the reference, and/or other metadata retrieved by web intelligence engine 106 during crawling.

Thus, server system 102 can implement efficient and accurate visual similarity searches according to outputs of perceptual similarity model 302 (e.g., including both near-exact copies and substantially altered or augmented variants) in order to return synchronous responses to queries on large sets of images (e.g., millions of images, billions of images) accessed from the web, thereby enabling users such as e-commerce platforms, social media applications, and content platforms to rapidly authenticate image and/or video uniqueness and/or originality against open web sources; discover unlicensed or unauthorized uses of their proprietary, copyrighted, or user-created visual media such as digital art, photography, and video assets on other websites or domains; and identify sources for visual media that are suspected to be manually or programmatically edited, manipulated, and/or altered.

Forward-Looking Visual Comparison

Web intelligence engine 106 continues to crawl web pages and fetch image data throughout operation of server system 102 as described above, which server system 102 can compare to visual feature mappings stored in a monitoring index via perceptual similarity model 302 in order to detect (unauthorized) use of duplicates and altered or manipulated variants of monitored content on other web pages days, months, or years after the initial monitoring request. More specifically, for each web content, such as web image or video, accessed and retrieved by web intelligence engine 106 after creation of the monitoring index, comparison engine 108 can execute perceptual similarity model 302 on the web content to generate a query visual feature mapping.

In one implementation, perceptual similarity model 302 can then compare the query visual feature mapping to reference visual feature mappings in the monitoring index as described above with respect to the web index. For each reference visual feature mapping of reference content stored in the monitoring index, perceptual similarity model 302 can derive, generate and/or compute a similarity metric (e.g., a normalized similarity score) for the reference content based on correlations between the query visual feature mapping (e.g., generated on the newly accessed web content) and the reference visual feature mapping stored and/or represented in the monitoring index (e.g., generated by perceptual similarity model at the time of the monitoring request). For example, perceptual similarity model 302 can compare visual feature mappings according to differences, such as Euclidean distance (e.g., in high-dimensional embedding space), cosine similarity, scalar product, vector product, and/or other correlation metrics in order to identify any reference content in the monitoring index that are visually similar (or visually identical) to query content accessed by web intelligence engine 106.

In another implementation, comparison engine 108 can retrieve reference content (e.g., the actual image and/or video files) stored in the monitoring index and sequentially pass this reference content along with the query content accessed by web intelligence engine 106 as pair-wise inputs to perceptual similarity model 302. Then, perceptual similarity model 302 generates visual feature mappings, compares the visual feature mappings, and outputs similarity scores for each pair directly to identify visual matches to the web content within the monitoring index while reducing the burden of implementing more complex indexing and similarity search algorithms for smaller monitoring indexes (e.g., one hundred images).

Leveraging perceptual similarity model 302 and web intelligence engine 106, server system 102 can therefore ingest and analyze user-designated visual content—such as copyrighted photographs or video, commercially-viable digital artwork, or (unpublished) images or video offered for sale, licensing, or download—and then crawl large numbers (e.g., thousands, millions) of web pages in order to broadly and accurately identify and report (e.g., to users, platforms, or rightsholders) unlicensed, unauthorized, or unapproved re-use of this visual content and modified variants elsewhere on the web at a later time. While the method has sometimes been described herein as being executed in conjunction with a single monitoring index, the system can also maintain a set of separate monitoring indexes that are unique to each individual user's organization (an application, platform, or website customer) and inaccessible by other users. In these implementations, the system is configured to route monitoring requests received at different endpoints to the corresponding monitoring index, execute visual comparisons to reference images in each monitoring index via perceptual similarity model 302 (e.g., in parallel), and serve responses to the appropriate communication endpoint in response to retrieving web images and/or videos that match content in a particular user's monitoring index, as described in more detail below.

The comparisons of visual feature mappings may be faster than pixel by pixel comparisons. The difference between visual feature mappings may be computed faster than comparing each pixel of a pair of images. Also, the comparison of visual feature mappings may yield more accurate results when alterations have been made to one instance of content because the similarity score may reflect the detected alterations.

Response

The response provided to client devices 104 may be different. In some embodiments, in addition to providing the similarity scores and associated content, server system 102 may compare similarity scores to a pre-defined or user-specified similarity threshold to determine and/or identify which, if any, reference content in the monitoring index is determined to match (e.g., are visually similar to) content accessed and retrieved by web intelligence engine 106. The comparison may generate a similarity score that may quantify a similarity between the reference content and query content. The similarity score may meet a similarity threshold, which may mean that the reference content is determined to be similar to the query content to determine a match.

In accordance with a determination that one or more similarity scores generated by perceptual similarity model 302 meet (e.g., exceed) this similarity threshold, server system 102 can (immediately) output or serve a response, alert, and/or notification to a user, such as an application or platform backend, that identifies the accessed web content that matches content(s) of that user's monitoring index. More specifically, the response can be a JSON object or other suitable data structure that includes: a link (e.g., a URL or IPFS address) to the web hosting location of the matching web content; one or more backlinks to web pages and/or web domains that host the matching file (e.g., as determined by web intelligence engine 106 during crawling), a similarity score calculated for the matching web content and reference content according to outputs of perceptual similarity model 302; and an identifier for and/or link to the reference content stored in the user's monitoring index, thereby enabling the user to automatically be notified of (unapproved) use of designated visual content—such as copyrighted or otherwise proprietary images that are not available or intended for public use—on the (large) set of pages crawled by web intelligence engine 106 days, months, or years after the visual content has been added to the user's monitoring index. The user can then take appropriate automatic or manual enforcement actions according to user policies, such as submitting a request to the web page's domain owner to remove the unlicensed content. Accordingly, server system 102 can therefore leverage web intelligence engine 106 to asynchronously monitor high-value or commercially viable content to detect use elsewhere on the internet and rapidly notify users (e.g., platforms, applications, or rightsholders) when visual matches to crawled images or videos are detected by perceptual similarity model 302, including cases in which the monitored content has been substantially altered, manipulated, or incorporated into other images, graphics, and/or videos.

By receiving requests and outputting the responses via the communication interface 112, server system 102 also enables the operations, training, and/or implementation of web intelligence engine 106, web index, and perceptual similarity model 302 to be abstracted (e.g., remote from and inaccessible by) user applications and platforms, thereby enabling users to access model-based image similarity comparisons between monitored content and large numbers of crawled web images and videos without the need to train and/or deploy web intelligence engine 106 and/or perceptual similarity model 302 on a user's internal computing infrastructure.

In implementations in which server system 102 maintains multiple monitoring indexes (e.g., for the different users), the communication interface 112 is configured to route responses to the correct communication endpoint associated with the monitoring index that stores matching visual content (i.e., without notifying other users with unrelated monitoring indexes). More specifically, over a given monitoring period, server system 102 can: continuously crawl, access, and retrieve web content via web intelligence engine 106; and for each web content retrieved by the web intelligence engine 106, server system 102 can then query a first monitoring index associated with a first communication endpoint (e.g., a first user) to execute perceptual similarity model 302 between the accessed web content and each reference content in the first monitoring index; concurrently (e.g., in parallel, in sequence) query a second monitoring index associated with a second communication endpoint (e.g., a second user unrelated to the first user) to execute perceptual similarity model 302 across the accessed web content and each reference content in the second monitoring index; and, in response to determining that a similarity score between an accessed web image/video and a first image/video in the first monitoring index exceeds a similarity threshold (i.e., identifying a visual match between the web content and reference content in the first monitoring index), outputting a response identifying the accessed web content to the first communication endpoint but not the second communication endpoint. Conversely, in response to determining that a similarity score between accessed web content and second reference content in the second monitoring index exceeds the similarity threshold, server system 102 can additionally or alternatively output a response identifying the accessed web content to the second communication endpoint but not the first communication endpoint.

Thus, server system 102 can concurrently monitor a set of distinct user-designated content indexes (e.g., three indexes configured for three different users, ten indexes configured for ten different users, or 100 indexes configured for 100 different users) in order to: identify unauthorized or unlicensed use or appearance of all monitored reference content in conjunction with web intelligence engine 106 and perceptual similarity model 302; and route alerts, notifications, and/or responses, including identifying information on matching web content encountered by web intelligence engine 106, to appropriate communication endpoints associated with individual user and/or individual monitoring index in response to detecting visual matches to monitored content.

The comparisons may be used to compare different types of content. For example, the comparison of video content, copyrighted video content, and logos may be used.

Model-Based Comparison of Video Content

Figure 5:
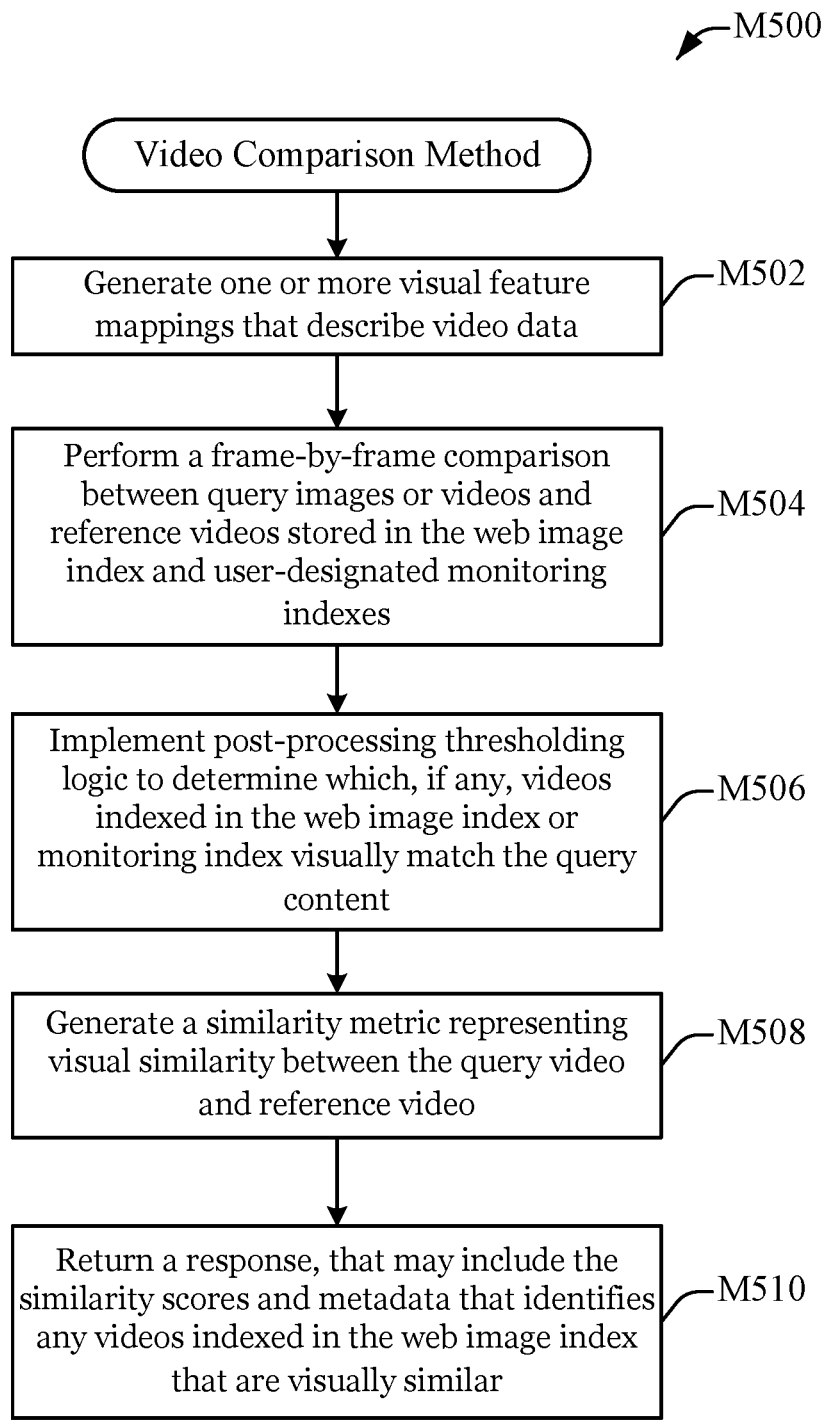
FIG. 5 depicts a simplified flowchart of comparing video content according to some embodiments.

As described above, comparison engine 108 can execute visual comparisons, via perceptual similarity model 302, between a query image and/or query video and video content indexed in the web index and/or user-designated monitoring indexes. FIG. 5 depicts a simplified flowchart 500 of comparing video content according to some embodiments. In implementations, at M502, perceptual similarity model 302 is configured to generate one or more visual feature mappings that describe video data. For example, perceptual similarity model 302 can generate a set of visual feature mapping corresponding to representative frames of the video captured at a pre-determined (or configurable) sampled rate. In another example, perceptual similarity model 302 can generate a single visual feature mapping (e.g., a video embedding) based on visual characteristics of the entire video file.

More specifically, at M504, comparison engine 108, in conjunction with perceptual similarity model 302, can perform a frame-by-frame comparison between query images or videos accessed via web intelligence engine 106 and reference videos stored in the web index and user-designated monitoring indexes. In this implementation, the system can execute perceptual similarity model 302 across frames sampled from the query video and a set of time-stamped frames (previously) sampled from each reference video to generate visual feature mappings when building the web index and/or monitoring index(es) to generate and compare visual feature mappings of frames sampled from the query video and reference content.

At M506, comparison engine 108 can then implement post-processing thresholding logic (e.g., based on similarity scores across frame pairs) to determine which, if any, videos indexed in the web index or monitoring index visually match the query content (i.e., a query image or query video). For example, comparison engine 108 can determine that a particular reference video matches the query content based on (i) the number of matching frames (e.g., frame pairs exceeding a similarity score threshold) identified in the reference video, (ii) the degree of similarity between matching frames as determined by perceptual similarity model 302 (e.g., giving more weight to higher similarity scores), and/or (iii) whether matching frames occur in sequence (e.g., high similarity scores for multiple, successive frames). Based on this thresholding logic, at M508, comparison engine 108 can then generate a similarity metric (e.g., an overall similarity score) representing visual similarity between the query video (or part of the query video) and reference video (or part of a reference video) stored in the copyrighted content index. At M510, comparison engine 108 compares the similarity metric to a pre-determined similarity threshold. At M512, server system 102 returns, via the communication interface 112, a response, that may include the similarity scores and metadata that identifies any videos indexed in the web index that are visually similar (or visually identical) to the query content and/or metadata that identifies content accessed by web intelligence engine 106 (e.g., URLs and backlinks) when comparing to user monitoring indexes.

In one example, server system 102 additionally or alternatively includes a second perceptual similarity model explicitly trained on video data (a "video similarity model") that is configured to generate video embeddings or visual feature mappings of video data in a video embedding space for (i) indexing in the copyrighted content index and/or (ii) comparing video embeddings generated for query videos to video embeddings generated for video content referenced in the web index and/or user monitoring indexes. Generally, the video similarity model can be trained according to the methods described above with respect to perceptual similarity model 302.

Variation: Copyright Content Index and Commercially Viable Video Content

In one variation, server system 102 additionally or alternatively includes an index of copyrighted or otherwise proprietary video content (referred to herein as a "copyrighted content index"), enabling the comparison engine to implement visual comparisons of query videos to content in the copyrighted content index via perceptual similarity model 302. The copyrighted content index can be assembled by sourcing and aggregating video via distributed protocol transfer, scraping of peer-to-peer filesharing platforms, and/ or aggregating local downloads of licensed content to construct a comprehensive repository of video files and/or visual feature embeddings of those video files, including: movies, films, and/or documentaries, with identifying metadata such as title and year, studio, rightsholder names, etc.; television shows, with identifying metadata such as show title, season number, episode number, episode title, studio rightsholder name, etc.; and commercially viable user-generated content such as live stream recordings, videos, podcasts, etc., with identifying metadata such as user name, video title, platform, and/or a URL to the video. For example, identifying metadata for movies and television shows can be accessed, crawled, and/or assembled from online databases (e.g., IMDb™) and indexed alongside corresponding video files and/or visual feature mappings of these image files generated by perceptual similarity model 302, allowing video content indexed in the copyrighted content index to be readily returned in responses to (user) query requests. The system can also continuously and/or periodically recrawl these databases during operation to identify newly released and/or uploaded video content for sourcing, download, analysis (e.g., via perceptual similarity model 302 as described above with respect the web index) and indexing within the copyrighted content index. Additionally or alternatively, the copyrighted content index can include a comprehensive library of copyrighted sports broadcasts—such as televised professional and/or collegiate team sports (football, basketball, baseball, hockey, etc.), racing, tennis, golf Olympic events, etc.—recordings of which are licensed from their respective content providers and/or recorded via an authorized cable subscription.

In this variation, the communication interface 112 additionally or alternatively includes a "copyright search" communication endpoint configured to receive and/or process requests to search the copyrighted content index for visual matches to a query video. In some embodiments, comparison engine 108 is configured to split a video asset and reference assets into representative frames (i.e., sample static images from the video or GIF at a predefined sampling rate) and perform image similarity analysis between frames of a video asset and corresponding frames of each reference video via perceptual similarity model 302. A variation therefore includes: receiving, via the communication interface, a request to analyze a query video for copyrighted material; splitting the query video into a set of representative frames (e.g., sampling "thumbnail" images at a pre-determined or configurable frame rate); passing the query video to a comparison engine that includes perceptual similarity model 302 and copyrighted content index storing a set of reference videos; for each reference video in the set of reference videos, executing the perceptual similar model on the reference video and the set of representative frames; and generate a similarity metric (e.g., a similarity score) between the query video and the reference video based on outputs of perceptual similarity model 302, thereby enabling server system 102 to perform accurate perceptual (e.g., visual) similarity comparisons between video content that are resilient to editing, augmentation, and differences in file format and/or resolution (including, for example, screen recordings, videos of a screen taken with another device, etc.).

As described above, server system 102, in conjunction with perceptual similarity model 302, can perform a frame-by-frame comparison between the query video and reference videos stored in the copyrighted content index, whereby the system executes perceptual similarity model 302 across frames sampled from the query video and a set of time-stamped frames (previously) sampled from each reference video to generate visual feature mappings when building the copyrighted content index to generate and compare visual feature mappings of frames sampled from the query video and reference. Server system 102 can then implement post-processing thresholding logic (e.g., based on similarity scores across each frame pair) to determine which, in any, videos indexed in the copyrighted content index visually match the query video. For example, server system 102 can determine that a particular reference video matches the query video based on (i) the number of matching frames (e.g., frame pairs exceeding a similarity score threshold) identified in the reference video, (ii) the degree of similarity between matching frames as determined by perceptual similarity model 302 (e.g., giving more weight to higher similarity scores), and/or (iii) whether matching frames occur in sequence (e.g., high similarity scores for multiple, successive frames). Based on this thresholding logic, server system 102 can then: generate a similarity metric (e.g., an overall similarity score) representing visual similarity between the query video (or part of the query video) and reference video (or part of a reference video) stored in the copyrighted content index, compare the similarity metric to a pre-determined similarity threshold, and return, via the communication interface, metadata that identifies any videos indexed in the copyrighted content index that are visually similar (or visually identical) to the query video.

In one implementation, the system can: receive, via the communication interface 112, a copyright search quest referencing a query video; using the video similarity model, generate a query visual feature mapping for the query video; generate similarity scores for reference videos indexed in the copyrighted content index based on correlations between the query visual feature mapping and visual feature mappings of videos indexed in the copyrighted content index; and, in response to a first similarity score for a first reference video exceeding a similarity threshold, serving, via the communication interface, a response to copy search request that includes identifying metadata for the first reference video.

As described above, the copyrighted content index can include and/or reference associated metadata that identifies each reference video indexed in the copyrighted content index. For example, identifying metadata for a movie or film can include a title, year, and identifiers for the production studio and/or rightsholder(s). Similarity, identifying metadata for a television show episode can include the show title, season number, episode number, episode title, and identifiers for the television show's production studio and/or rightsholder(s). In response to identifying a visual match between (part of) the query video submitted by a user via the communication interface and (part of) a reference video indexed in the copyrighted content index, the system can serve (e.g., output) a synchronous response, notification, or alert to the user that includes the identifying metadata for any matching reference videos in the copyrighted content index, thereby enabling the user to easily and quickly identify the query video as including copyrighted or otherwise proprietary video content. In cases where the query video matches only part of the reference video (e.g., the query video incorporates a short clip from the reference video), the response can also include timestamps that indicate which part of the reference video visually matches the query video. Based on the response, the user (e.g., an application or platform) can then take appropriate automatic or manual enforcement actions such as removing the query video from the user's platform and/or serving a notice of DMCA violation to an account that posted the video.

Server system 102 can therefore accurately identify, in conjunction with perceptual similarity model 302, visual (e.g., perceptual) matches to submitted query videos within a (large) corpus of copyrighted or proprietary video content and serve users such as content platforms with near real-time responses to enable automatic identification of (user-generated) video content that may violate copyright agreements or otherwise re-uses proprietary content.

Variation: Web Index Search & Monitoring with Other Models

In one variation, server system 102 also includes an artificial intelligence and/or machine learning model—such as a deep learning network, a convolutional neural network, or a residual learning network—trained to detect and/or classify logos in images and/or video content (referred to herein as a "logo classification model"). Generally, the logo classification model is a multi-headed visual classifier trained, through supervised analysis of a corpus of labeled training data, to classify images and video as containing (or not containing) one or more logos associated with a set of brands (e.g., ten brands, hundreds of brands, thousands of brands).

In this variation, server system 102 can execute the logo classification model on images accessed by web intelligence engine 106 to generate and store additional logo classification metadata alongside the web index, which can then be accessed and returned in response to later query or monitoring requests to identify (potentially) unlicensed use of brand logos on web pages. More specifically, upon fetching an image or video from a crawled web image, server system 102 can execute the logo classification model on the crawled web content to generate a similarity score for each supported logo or brand and compare these similarity scores to a pre-determined similarity threshold. In response to one or more of these similarity scores exceeding the confidence threshold, the system can then generate a logo metadata label indicating the brand(s) represented by any logos identified, by the logo classification model, in the crawled web image/video and store the logo metadata label alongside other identifying metadata (e.g., URL and webpage backlinks) associated with the image when indexing the image or video into the web index. The system can therefore index web images and/or videos accessed by web intelligence engine 106 according to logo metadata labels generated by the logo classification model to enable (near) real-time queries over visual content accessed and indexed by web intelligence engine 106 by logo or brand.

In this variation, server system 102 can also monitor web images and/or videos accessed by web intelligence engine 106 for specific brands and/or logos designated in monitoring requests received via the communication interface 112. More specifically, server system 102 can receive, via the communication interface 112, a monitoring request from a user specifying an identifier for a first brand logo. Over a subsequent monitoring period (e.g., months, years), server system 102 can then: deploy a web crawler (e.g., web intelligence engine 106) to continuously fetch visual content from public webpages; for each fetched web image and/or video, execute the logo classification model to generate a set of confidence scores representing a set of brand logos supported by the logo classification model, and compare a first confidence score for the first brand logo to a similarity threshold. In response to the first similarity score (i.e., the similarity score for the class that corresponds to the brand identified in the monitoring request) for a particular fetched image exceeding the similarity threshold, server system 102 can (immediately) serve, via the communication interface, a response to the user's associated communication endpoint that includes metadata (e.g., a link to the image, backlinks to web pages that host the image) identifying the image/video, thereby enabling brand owners and other users to be automatically notified of (unauthorized) use of particular logos on public webpages.

Computer System

Figure 6:
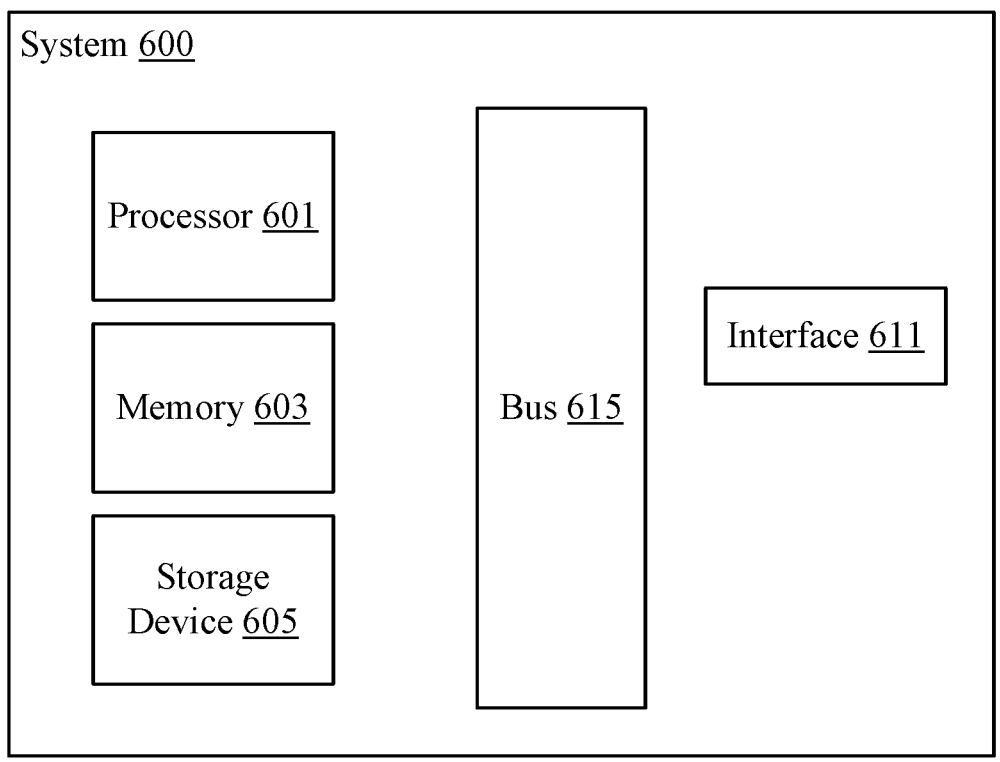
FIG. 6 illustrates an example computer system on which one or more embodiments can be implemented.

FIG. 6 illustrates one example of a computing device according to some embodiments. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as a variety of devices such as server system 102, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. Memory 603 may be random access memory (RAM) or other dynamic storage devices. Storage device 605 may include a non-transitory computer-readable storage medium holding information, instructions, or some combination thereof, for example instructions that when executed by the processor 601, cause processor 601 to be configured or operable to perform one or more operations of a method as described herein. Bus 615 or other communication components may support communication of information within system 600. The interface 611 may be connected to bus 615 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
    receiving query content that includes first visual data;
    selecting reference content that includes second visual data;
    determining a model, wherein the model comprises:
        a first sub-model that is trained with a first training dataset to output a first score based on a comparison of a content pair to detect visible alterations in the content pair, and
        a second sub-model that is trained with a second training dataset to output a second score based on a comparison of a content pair for a visible match as distinguishable by a human wherein the second sub-model outputs a higher second score for similarity when visible identifiable, wherein the first sub-model is trained to output a higher score for similarity than the second sub-model when visible alterations are found in the content pair and are identifiable by the human;
    generating a first visual feature mapping for the query content using the first sub-model and the second sub-model;
    determining a second visual feature mapping for the reference content, wherein the second visual feature mapping is determined using the first sub-model and the second sub-model of the model;
    comparing the first visual feature mapping and the second visual feature mapping for the first sub-model and the second sub-model to generate a third score that rates a similarity between the query content and the reference content; and
    outputting the third score.

2. The method of claim 1, further comprising:
    comparing the third score to a threshold; and
    when the third score meets the threshold, sending a response to a client device with information based on the third score.

3. The method of claim 2, wherein sending the response comprises:
    sending the response with the third score and information for the reference content.

4. The method of claim 1, further comprising:
    crawling web pages to determine reference content;
    generating second visual feature mappings for each reference content using the model; and
    storing the second visual feature mappings in a first index.

5. The method of claim 4, wherein:
    the query content is received from a client device for monitoring, and
    the second visual feature mappings are compared to the query content.

6. The method of claim 1, further comprising:
    storing the second visual feature mapping for the query content in a monitoring index;
    crawling web pages to determine new query content;
    generating a new first visual feature mapping for the new query content using the model; and
    comparing the new first visual feature mapping to the second visual feature as new reference content to generate a third score that rates a similarity between the new query content and the new reference content.

7. The method of claim 6, further comprising:
    comparing the first visual feature mapping and the second visual feature mapping to generate a new third score that rates a similarity between the query content and the reference content; and
    outputting the new third score.

8. The method of claim 7, further comprising:
    comparing the new third score to a threshold; and
    when the new third score meets the threshold, sending a response to a client device with information based on the third score.

9. The method of claim 1, wherein generating the score comprises:
    inputting the query content and the reference content into the first sub-model and the second sub-model;
    generating the first visual feature mapping for the query content and the second visual feature mapping for the reference content using the first sub-model and the second sub-model; and comparing the first visual feature mapping and the second visual feature mapping using the first sub-model and the second sub-model to output the first score and the second score, respectively.

10. The method of claim 1, wherein generating the score comprises:
inputting the query content into the first sub-model and the second sub-model;
generating the first visual feature mapping for the query content using the first sub-model and the second sub-model;
retrieving the second visual feature mapping for the reference content from an index, wherein the second visual feature mapping was generated using the first sub-model and the second sub-model; and
comparing the first visual feature mapping and the second visual feature mapping using the first sub-model and the second sub-model to output the first score and the second score, respectively.

11. The method of claim 1, further comprising:
inputting content pairs into the first sub-model and the second sub-model, wherein the content pairs are labeled with a label that rates the similarity between the content pairs; and
training parameters of the first sub-model and the second sub-model to generate visual feature mappings for the content pairs based on the labels.

12. The method of claim 11, wherein training parameters comprises:
adjusting parameter values based on a comparison of the visual feature mappings for the content pairs and the label for the content pairs.

13. The method of claim 11, wherein training parameters of the firstsub-model comprises:
adjusting parameter values to detect alterations in one instance of a content pair based on a comparison of the visual feature mappings for the content pair and the label for the content pair, wherein the parameter values are adjusted to generate higher first scores where one of the content pairs has been visibly altered to produce the other content pair.

14. The method of claim 11, wherein training parameters of the second sub-model comprises:
adjusting parameter values to detect alterations in one instance of a content pair based on a comparison of the visual feature mappings for the content pair and the label for the content pair, wherein the parameter values are adjusted to generate higher second scores when alterations are detected between the content pairs, but are visibly indistinguishable to the human.

15. The method of claim 11, wherein training parameters comprises:
progressively altering one or more of the content pair; and
adjusting parameter values to detect the progressive alterations in the one or more of the content pair based on a comparison of the visual feature mappings for the content pair and the label for the content pair, wherein the parameter values are adjusted to generate a score that indicates the content pair is more similar.

16. The method of claim 1, wherein:
the first score is combined with the second score to generate the third score.

17. The method of claim 1, wherein:
the first score is used as the third score when visible alterations are detected, and
the second score is used as the third score when visible alterations are not detected.

18. A non-transitory computer-readable storage medium having stored thereon computer executable instructions, which when executed by a computing device, cause the computing device to be operable for:
receiving query content that includes first visual data;
selecting reference content that includes second visual data;
determining a model, wherein the model comprises:
a first sub-model that is trained with a first training dataset to output a first score based on a comparison of a content pair to detect visible alterations in the content pair, and
a second sub-model that is trained with a second training dataset to output a second score based on a comparison of a content pair for a visible match as distinguishable by a human wherein the second sub-model outputs a higher second score for similarity when visible alterations are visually indistinguishable to a human compared to visually identifiable, wherein the first sub-model is trained to output a higher score for similarity than the second sub-model when visible alterations arefound in the content pair and are identifiable by the human;
generating a first visual feature mapping for the query content using the first sub-model and the second sub-model of the model;
determining a second visual feature mapping for the reference content, wherein the second visual feature mapping is determined using the first sub-model and the second sub-model of the model;
comparing the first visual feature mapping and the second visual feature mapping for the first sub-model and the second sub-model to generate a third score that rates a similarity between the query content and the reference content; and
outputting the third score.

19. The non-transitory computer-readable storage medium of claim 18, further operable for:
crawling web pages to determine reference content;
generating second visual feature mappings for each reference content using the model; and
storing the second visual feature mappings in a first index.

20. An apparatus comprising:
one or more computer processors; and
a computer-readable storage medium comprising instructions for controlling the one or more computer processors to be operable for:
receiving query content that includes first visual data;
selecting reference content that includes second visual data;
determining a model, wherein the model comprises:
a first sub-model that is trained with a first training dataset to output a first score based on a comparison of a content pair to detect visible alterations in the content pair; and
a second sub-model that is trained with a second training dataset to output a second score based on a comparison of a content pair for a visible match as distinguishable by a human wherein the second sub-model outputs a higher second score for similarity when visible alterations are visually indistinguishable to a human compared to visually identifiable, wherein the first sub-model is trained to output a higher score for similarity than the second sub-model when visible alterations are found in the content pair and are identifiable by the human;

generating a first visual feature mapping for the query content using the first sub-model and the second sub-model of the model;

determining a second visual feature mapping for the reference content, wherein the second visual feature mapping is determined using the first sub-model and the second sub-model of the model;

comparing the first visual feature mapping and the second visual feature mapping for the first sub-model and the second sub-model to generate a third score that rates a similarity between the query content and the reference content; and outputting the third score.

\* \* \* \* \*